(12) United States Patent
Turner et al.

(10) Patent No.: US 9,934,635 B2
(45) Date of Patent: Apr. 3, 2018

(54) APPLICATION AND PLATFORM FOR TEMPORARY CONTROL OVER PROPERTY ACCESS FUNCTIONS

(71) Applicant: HomeAway.com, Inc., Austin, TX (US)

(72) Inventors: Ryan Hedley Turner, Austin, TX (US); Daniel Steven Haligas, Panama City, FL (US); Velayudhan Pillai Venugopal, Austin, TX (US); Alex Holm Devine, Austin, TX (US)

(73) Assignee: HomeAway.com, Inc., Austin, TX (US)

( * ) Notice: Subject to any disclaimer, the term of this patent is extended or adjusted under 35 U.S.C. 154(b) by 0 days.

(21) Appl. No.: 14/544,209

(22) Filed: Dec. 8, 2014

(65) Prior Publication Data

US 2016/0163138 A1 Jun. 9, 2016

(51) Int. Cl.

| | |
|---|---|
| *G07C 9/00* | (2006.01) |
| *H04W 4/02* | (2009.01) |
| *G06Q 10/02* | (2012.01) |
| *H04L 29/12* | (2006.01) |
| *H04M 15/00* | (2006.01) |
| *G06Q 30/06* | (2012.01) |

(52) U.S. Cl.
CPC ......... *G07C 9/00166* (2013.01); *G06Q 10/02* (2013.01); *G06Q 30/0645* (2013.01); *H04L 61/1529* (2013.01); *H04M 15/56* (2013.01); *H04W 4/021* (2013.01); *H04W 4/028* (2013.01)

(58) Field of Classification Search
None
See application file for complete search history.

(56) References Cited

U.S. PATENT DOCUMENTS

| | | | |
|---|---|---|---|
| 8,855,681 | B1 | 10/2014 | George et al. |
| 2002/0111172 | A1 | 8/2002 | DeWolf et al. |
| 2007/0039024 | A1 | 2/2007 | Krajcev et al. |
| 2007/0185744 | A1 | 8/2007 | Robertson |
| 2009/0163182 | A1 | 6/2009 | Gatti et al. |
| 2010/0015993 | A1* | 1/2010 | Dingler ................ G06Q 10/109 455/456.1 |

(Continued)

OTHER PUBLICATIONS

Reth International Group, Products, Oct. 8, 2007, 'http://www.rethlock.com.tw/product_view.asp?FkindNo=F000720&SkindNo=&ItemNo=&PidNo=200710080002'.*

*Primary Examiner* — Daniell L Negron
(74) *Attorney, Agent, or Firm* — Knobbe, Martens, Olson & Bear, LLP

(57) ABSTRACT

A computing device may be configured to transition control over one or more functions of a rental unit to a user (e.g., a traveler) based on one or more of time, geo-location and access credentials. Access may be granted to the traveler to use one or more home automation functions including a HVAC system, a thermostat, lighting, security alarm, automated door locks, etc. An owner of the rental unit may have access to some or all of the home automation functions blocked during the traveler's stay at the rental unit, and at an end of the stay owner access to those functions may be enabled. Some functions may be activated prior to the traveler's arrival at the unit based on a time to arrival and/or distance from the unit. An application on a traveler's computing device may be configured to summon a repair service for the unit.

17 Claims, 11 Drawing Sheets

(56) References Cited

U.S. PATENT DOCUMENTS

| | | |
|---|---|---|
| 2010/0063854 A1 | 3/2010 | Purvis et al. |
| 2010/0191551 A1 | 7/2010 | Drance et al. |
| 2010/0201482 A1* | 8/2010 | Robertson ............ G07C 9/00111 340/5.61 |
| 2011/0066962 A1 | 3/2011 | Nash et al. |
| 2012/0060101 A1 | 3/2012 | Vonog et al. |
| 2013/0085790 A1 | 4/2013 | Palmer et al. |
| 2013/0238370 A1 | 9/2013 | Wiseman et al. |
| 2013/0297075 A1* | 11/2013 | Land, III ................ G05B 15/02 700/275 |
| 2014/0002236 A1* | 1/2014 | Pineau .................... G06F 21/32 340/5.6 |
| 2014/0035949 A1 | 2/2014 | Singh et al. |
| 2014/0077929 A1* | 3/2014 | Dumas ............... G07C 9/00571 340/5.61 |
| 2014/0283135 A1 | 9/2014 | Shepherd et al. |

\* cited by examiner

APPLICATION AND PLATFORM FOR TEMPORARY CONTROL OVER PROPERTY ACCESS FUNCTIONS

CROSS-REFERENCE TO RELATED APPLICATIONS

This application is related to U.S. patent application Ser. No. 14/562,629, filed on Dec. 5, 2014, titled "Adaptive Advisory Engine And Methods To Predict Preferential Activities Available At A Region Associated With Lodging" which is hereby incorporated by reference in its entirety for all purposes.

FIELD

The present application relates generally to systems, software, electronic messaging, mobile computing and communication devices. More specifically, systems, computing devices, and methods for temporary control of property access and functions are disclosed.

BACKGROUND

Travelers who have booked a stay at a property, such as vacation rental may require access to various functions provided at the rental such as key codes for door locks, authorization for access to automated door locks, wireless access point network names and passwords, access to HDTV's and other electronics that may be provided, automated lighting and HVAC functions, and automated thermostats, just to name a few. Many of the functions may be configured for wireless access via a control source such as a traveler's smartphone or tablet, for example.

The traveler may require an application on the traveler's smartphone or tablet to access the various functions available at the rental unit. However, the traveler may need to obtain the necessary access credentials, access codes (e.g., door lock codes) from the owner of the rental unit. Relying on the owner to provide the correct codes in a timely manner may be problematic, especially if the owner does not live or is unavailable in the geographic region where the rental unit is located. It may not be possible or impracticable for the traveler to contact the owner. Moreover, while the traveler is occupying the rental unit, the traveler may prefer to have exclusive access to functions without any conflicting access to functions by the owner.

Thus, there is a need for devices, systems and methods that facilitate temporary access and control over functions at a property for travelers.

BRIEF DESCRIPTION OF THE DRAWINGS

Various embodiments or examples ("examples") of the present application are disclosed in the following detailed description and the accompanying drawings. The drawings are not necessarily to scale.

DETAILED DESCRIPTION

Various embodiments or examples may be implemented in numerous ways, including as a system, a process, a method, an apparatus, a user interface, or a series of program instructions on a non-transitory computer readable medium such as a computer readable storage medium or a computer network where the program instructions are sent over optical, electronic, or wireless communication links. In general, operations of disclosed processes may be performed in an arbitrary order, unless otherwise provided in the claims.

A detailed description of one or more examples is provided below along with accompanying figures. The detailed description is provided in connection with such examples, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For clarity, technical material that is known in the technical fields related to the examples has not been described in detail to avoid unnecessarily obscuring the description.

Figure 1:
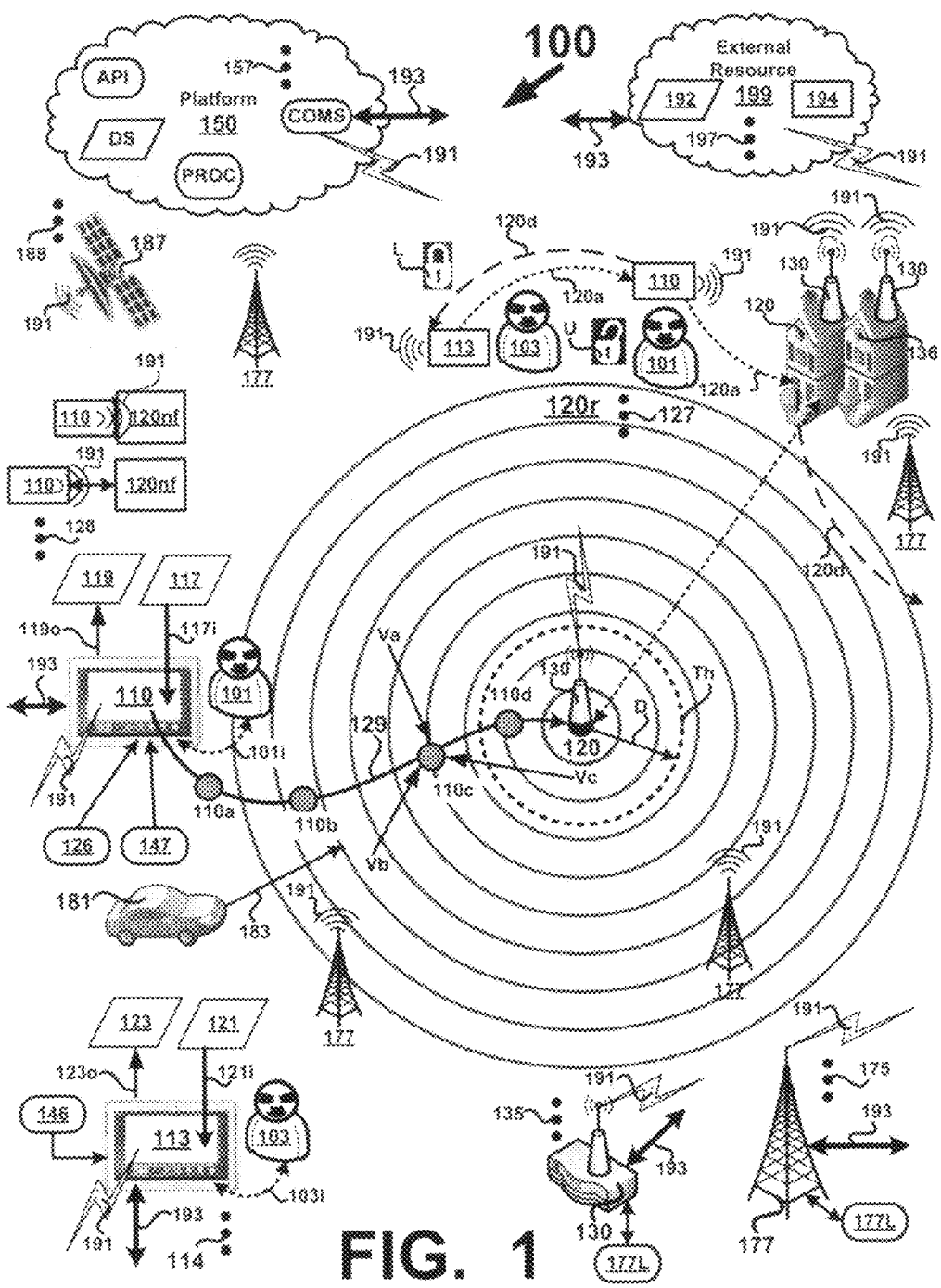
FIG. 1 depicts one example of temporary control over access functions of a rental unit upon arrival of the traveler at the unit.

Reference is now made to FIG. 1 where one example 100 of temporary control over access functions of a rental unit 120 being transitioned from an owner 103 to a traveler 101 upon arrival of the traveler 101 at the rental unit 120 is depicted. A traveler 101 may have a wireless computing device 110 (e.g., a smartphone, tablet, pad, laptop, PDA, gaming device, etc.) that may be in communication with other systems and/or resources, such as a wireless 191 and/or a wired 193 communications links, an external resource 199 (e.g., Internet, Cloud, etc.), a platform 150, a wireless access point 130, a cellular communications network 177, a communication satellite 187 (e.g., a GPS satellite), just to name a few. There may be more wireless computing devices 110 and travelers 101 as denoted by 128. Wireless computing device 110 will be referred to as traveler device 110 hereinafter. There may be more or fewer wireless access points 130, cellular communications networks 177, and satellites 187 than depicted in FIG. 1 as denoted by 135, 175 and 188 respectively. Data communications between the device 110 and the platform 150 may be direct (e.g., via 191 and/or 193) or may be routed through one or more other portal computing devices, such as wireless access points 130 and/or cellular communications network 140, for example. Other computing devices, such as a wireless computing device 113 of owner 103 (e.g., an owner of a rental property, a business owner, etc.). Device 113 may also communicate with platform 150 using wireless 191 and/or wired 193 communications links. There may be more or fewer devices 113 and owners 103 than depicted as denoted by 114.

Traveler device 110 and owner device 113 may transmit (119*o*, 123*o*) output data (119, 123) and may receive (117*i*, 121*i*) input data (117, 121). Output data 119 may include location data and/or temporal data generated by or stored in device 110. Temporal data may be generated by an electronic system, such as a clock included in device 110. Location data may be generated by radio frequency (RF) systems and/or sensors in device 110. Examples of sensors include but are not limited to one or more motion sensors, an accelerometer, a multi-axis accelerometer, and a gyroscope. Location data may be received from other communications resources such as from access points 130, cellular networks 177, and satellite 187, for example. RF signals (e.g., 191) communicated between devices 110, 130, 177 may include location data and access points 130 and cellular networks 177 may include a data store that logs or otherwise tracks location data 177L associated with one or more devices 110 in geographic location 120*r*. An application (e.g., APP 126) on device 110 may access from device 110 and/or external systems (e.g., external resource 199, access points 130, cellular network 177, or others), location data (e.g., GPS, geolocation or other locations based services) associated with device 110. Location data 177L from computing devices (e.g., 130, 177) may be used in addition to or instead of location data from device 110 to determine a location of traveler 101 via the traveler device 110 in the geographic location 120*r*. In some examples, location data may include information on radio frequency (RF) signals emitted by device 110, such as received signal strength indicator (RSSI), RF signal strength, or data included in packets or other data structures included in a RF transmission 191 from device 110 (e.g., MAC Address, IP address, Bluetooth address, etc.).

Wireless communications may include but is not limited to WiFi, WiMAX, Bluetooth, near filed communications (NFC), and cellular (e.g., 2G, 3G, 4G), for example. Wired communications may include but is not limited to local area network (LAN), universal serial bus (USB), FireWire, and Lightning, for example. An external resource 199 may include and/or have access to computing resources 194 and data storage resources 192, and there may be more or fewer computing resources 194 and data storage resources 192 than depicted as denoted by 197. Platform 150 may also include and/or have access to networked resources, such as computing (PROC) resources, data storage resources (DS), communications interface (COMS), and an applications programming interface (API).

In FIG. 1, APP 126 executing in association with a processor of device 110 may access hardware and/or software systems and/or resources of device 110 to transmit data 119 via a path 119*o* to one or more external systems (e.g., platform 150). Data 119 may include but is not limited to location data, location history data, temporal data, estimated time of arrival (ETA), distance calculation data related to events (such as an estimated arrival at rental unit 120), access credentials, media content, free text, structured text, metadata, and electronic messages, for example. APP 126 may receive data 117 via a path 117*i* from one or more external systems (e.g., platform 150). Data 117 may include but is not limited to request(s), push messages (e.g., information on other events for traveler 101 to consider), electronic messages (e.g., text, email, tweets, IM's), verification data (e.g., location data, access credential data), push location data (e.g., location data for other events the traveler 101 may partake in), location history, push events (e.g., events related to offers from owners 113 for the traveler 101 to consider), applications (APP's) for traveler device 110, and configuration data (CFG) (e.g., to configure traveler device 110).

Further to the example of FIG. 1, the geographic location 120*r* may include one or more travelers 101 than depicted. Access points 130 may be disposed at each property (120, 136) to provide data communications access with platform 150 or other resources, such as external resource 199, for example. During their stay at rental unit 120, traveler 101 may move 129 about geographic location 120*r* with devices 110 and other systems such as access points 130, cellular networks 177 and satellite 187 may gather location data on device 110 as it moves 129 within region 120*r*.

For purposes of explanation, the following example scenario includes the traveler 101 traveling by car 181 towards a destination at a vacation rental unit 120 located in a geographic location 120*r*. A path 129 depicts one example of a route that the traveler 101 may take. Along path 129, points 110*a*-110*d* depict different location along the path where location data for traveler device 110 may be tracked or otherwise logged. For example, when the traveler device 110 is far away from access point 130 at the rental unit 120, longer range communications networks such as cellular networks 177 and satellite 187 may track location data for traveler device 110. Different cellular networks 177 may compute location data Va-Vc for traveler device and data from those locations may be used to determine a location of device 110 relative to a location of the rental unit 120 or some other location. For example, location data Va-Vc may be used to triangulate the location of device 110 at point 110*c*.

Upon arrival of the traveler 101 and his/her device at rental 120, the device 110 may be within a threshold Th of an allowable distance D for an allowable location (e.g., the rental 120) and within the threshold Th the access point 130 in rental 120 may detect a radio frequency signature of device 110 and access credentials for access to automated functions available to traveler 101 at rental 120 may be activate upon verification of the access credentials. The automated functions may be transferred or otherwise transitioned from owner access (e.g., via owner device 113) to traveler access (e.g., via traveler device 110) as denoted by dashed arrow 120*a*. The automated functions, as will be described below in FIG. 3, may be unlocked U for the traveler 101 and owner access to those automated functions may be locked L for a period of time, such as the duration of traveler's 101 stay at the rental (e.g., as determined by stay data 1066). Platform 150 may be configured to lock out owner access to the automated functions upon receiving data representative of the traveler's 101 access credentials being verified and location data consistent with the traveler's 101 presence at the rental unit 120 (e.g., from location data and/or RF Signature data on device 110). For example, a set of codes or other data for automated functions may be changed during the stay to lock-out L owner access, and upon departure of the traveler 101 from the rental 120, the codes may be changed again to unlock U owner access to the automated functions and lock-out L traveler access to the automated functions as denoted by dashed line 120*d*.

Owner 103 may own other rental units, such as an adjacent rental unit 136 and the owner may still retain access to automated functions of the other rental units (e.g., rental unit 136 via owner device 113) until such a time as a traveler (not shown) arrives at unit 136 to begin a stay, and at that time access to the automated functions of unit 136 will transfer from owner to traveler, locking-out L access for the owner and unlocking U access for the traveler. Additional rental units that are commonly owned by the same owner may be in the same region or may be in different regions.

The tracking of device 110 location at points 110a-110d or other points may be used to trigger activation of one or more automated functions of unit 120 prior to arrival of the traveler 101 at the rental unit 120 as will be described below in regards to FIGS. 3 and 4. In some example, traveler device 110 may include near field communications (NFC) capability and a near field device 120nf in rental unit 120 may be used to communicate with device 110 when 120nf and 110 are placed into contact with each other or positioned in near field proximity of each other (e.g., 10 cm or less in distance). Near field device 120nf may be coupled with or included in an automated function, such as a door lock, for example.

Figure 2:
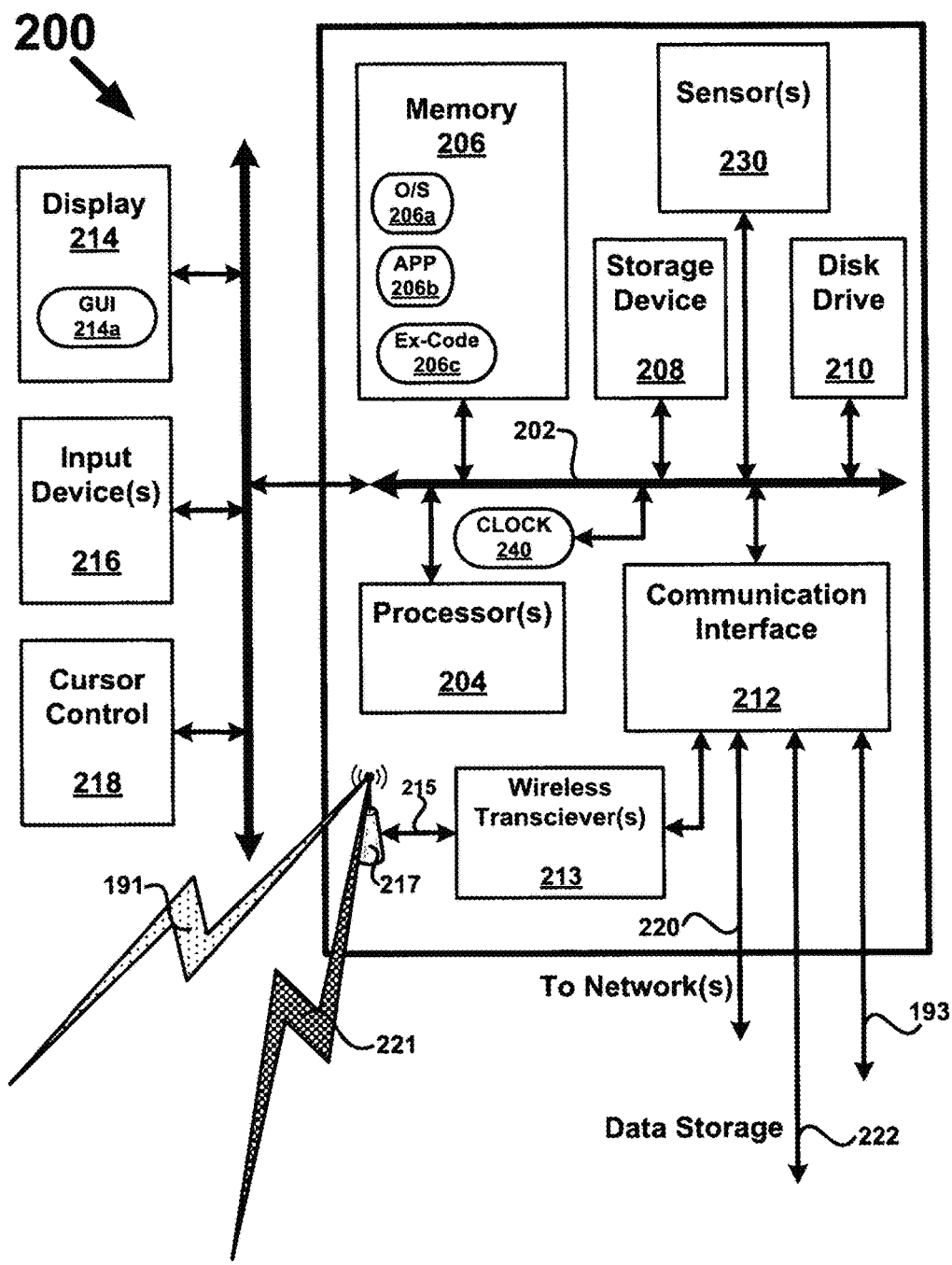
FIG. 2 depicts one example of a computer system.

FIG. 2 illustrates an exemplary computer system 200 suitable for use in one or more systems, devices, compute engines, apparatus, traveler devices, owner devices, wireless devices, wireless systems, backend systems, front end systems, networked systems, platforms, data storage devices, data storage systems, external resources, host devices or others described in reference to FIGS. 1, 3-6 and 10-11. In some examples, computer system 200 may be used to implement computer programs, algorithms, an application (APP), an application programming interface (API), configurations, methods, processes, or other software to perform the above-described techniques. Computer system 200 may include circuitry, hardware, and other electronic systems to perform the above-described techniques. Computer system 200 may include a bus 202 or other communication mechanism for communicating information, which interconnects subsystems and devices, such as one or more processors 204 (e.g., µC, µP, DSP, ASIC, FPGA, Baseband, etc.), system memory 206 (e.g., RAM, SRAM, DRAM, Flash), storage device 208 (e.g., Flash, ROM), disk drive 210 (e.g., magnetic, optical, solid state), communication interface 212 (e.g., modem, Ethernet, WiFi, Cellular), display 214 (e.g., CRT, LCD, LED, OLED, touch screen), input device 216 (e.g., keyboard, stylus, touch screen, mouse, track pad), and cursor control 218 (e.g., mouse, trackball, stylus). Some of the elements depicted in computer system 200 may be optional, such as elements 214-218, and one or more clocks 240 which may provide temporal data, for example, one or more sensors 230 which may provide location data, rate of motion data and other data associated with movement 129, and computer system 200 need not include all of the elements depicted. Display 214 may present a user interface (UI), such as a graphical user interface (GUI) 214a. Memory 206 may include computer executable programs and/or data embodied in a non-transitory computer readable medium, such as an operating system (OS) 206a, an application (APP) 206b, and executable code (Ex-Code) 206c, for example. APP 206b may be an application that may be downloaded or otherwise installed from a location such as an application store (e.g., Google Play® or the App Store®), for example.

According to some examples, computer system 200 performs specific operations by one or more processors 204 executing one or more sequences of one or more instructions stored in system memory 206. Such instructions may be read into system memory 206 from another non-transitory computer readable medium, such as storage device 208 or disk drive 210 (e.g., a HDD or SSD). In some examples, circuitry may be used in place of or in combination with software instructions for implementation. The term "non-transitory computer readable medium" refers to any tangible medium that participates in providing instructions and/or data to processor(s) 204 for execution. Such a medium may take many forms, including but not limited to, non-volatile media and volatile media. Non-volatile media includes, for example, optical, magnetic, or solid state disks, such as disk drive 210. Volatile media includes dynamic memory, such as system memory 206. Common forms of non-transitory computer readable media includes, for example, floppy disk, flexible disk, hard disk, SSD, magnetic tape, any other magnetic medium, CD-ROM, DVD-ROM, Blu-Ray ROM, USB thumb drive, SD Card, any other optical medium, punch cards, paper tape, any other physical medium with patterns of holes, RAM, PROM, EPROM, FLASH-EPROM, any other memory chip or cartridge, or any other medium from which a computer may read.

Sensor(s) 230 may include but are not limited to one or more inertial sensors (e.g., an accelerometer, a multi-axis accelerometer, a gyroscope, a magnetometer, etc.), an altimeter, and a barometer, for example. One or more sensors in sensor(s) 230 may be used to determine location data for a device that includes computer system 200 and/or is in communication with computer system 200 (e.g., a client device, a smartphone, a tablet, a pad, a laptop, PC, a wireless device, a portal computing device, a computing device, a networked computing device, a platform, a backend service, etc.). One or more of the memory 206, storage device 208, or disk drive 210 may be accessed as a data store for location data from sensor(s) 230 or other systems in communication (e.g., via communications interface 212) the computer system 200. Location data may be communicated to/from the computer system 200 via one or more of the wireless transceivers 213.

For example, radio frequency signal sources including but not limited to GPS satellite signals (e.g., signals 191 from one or more GPS satellites 187), terrestrial location transmitters (e.g., one or more cellular towers), WiFi signals, WiMAX signals, WiFi routers, WiFi access points, Bluetooth signals (e.g., Bluetooth beacons), near field communication signals, iBeacons, data from external resource 199, and platform 150. Other signal and/or data sources for location data may include but are not limited to audio signals (e.g., ultrasonic signals) and signals and/or data generated by location tracking software (e.g., internal to and/or external to computer system 200), for example. In some examples, location data and/or signals may be communicated wireless communications link (e.g., 191) and/or a wired communications link (e.g., 193). Location data accessed by computer system 200 may include but is not limited to a location history data base (e.g., 147) and location data 1030, for example. The location data may be updated, revised or otherwise change on a dynamic basis as the guest device 110 moves 129 around in areas around event 120.

Instructions may further be transmitted or received using a transmission medium. The term "transmission medium" may include any tangible or intangible medium that is capable of storing, encoding or carrying instructions for execution by the machine, and includes digital or analog communications signals or other intangible medium to facilitate communication of such instructions. Transmission media may include coaxial cables, copper wire, and fiber optics, including wires that comprise bus 202 for transmitting a computer data signal or other signals (e.g., from hardware or circuitry). In some examples, execution of the sequences of instructions may be performed by a single computer system 200. According to some examples, two or more computer systems 200 coupled by communication link 220 (e.g., LAN, Ethernet, PSTN, USB, or wireless network) may perform the sequence of instructions in coordination with one another. Computer system 200 may transmit and receive messages, data, and instructions, including programs, (i.e., application code), through communication link 220 and communication interface 212. Received program code may be executed by processor 204 as it is received, and/or stored in disk drive 210, or other non-volatile storage for later execution. Computer system 200 may optionally include a wireless transceiver 213 coupled with the communication interface 212 and coupled 215 with an antenna 217 for receiving and generating RF signals (191, 221), such as from a WiFi network, WiMAX network, BT radio, Cellular network, networked computing resources, external resource 199, client devices (e.g., 110), owner devices (e.g., 113), near field communication (NFC), satellite network, data storage network, or other wireless network and/or wireless devices, for example. Examples of wireless devices (e.g., client devices) may include but is not limited to those depicted in FIGS. 1, 3-6 and 10-11. Communications interface 212 may be coupled 222 with data storage external to computer system 200. Communications interface 212 may be coupled 193 with external resources and/or systems, such as those depicted in FIGS. 1, 3-6 and 10-11, for example. Computer system 200 may be used to implement a computing device (e.g., 110, 113), a portal computing device (e.g., 130, 177, 180), a networked computing device (e.g., 1053, 1055, 1059, 1080), the platform 150, and external resource (e.g., 199), for example.

Processor(s) 204 may be coupled 202 with signals from circuitry or other hardware systems of computer system 200. For examples, signals from clock 240, sensors 230, and communications interface (e.g., via wireless transceivers 213) may be processed by processor 204 and/or other circuitry to calculate an estimated time of arrival of the device 110 (e.g., due to motion 129 of traveler 101 carrying device 110) at an event in geographic location 120r. The ETA may be calculated based on time data from clock 240 and one or more of location data, speed data (e.g., scalar data), or velocity data (e.g., vector data). Speed or velocity data may be calculated from signals from sensors 230 and changes in location data as traveler 101 and his/her associated device 110 move 129 relative an some event or other reference point. Rate of travel (e.g., distance traveled per unit of time) may be calculated using signals from clock 240, sensors 230 and/or location data.

Figure 3:
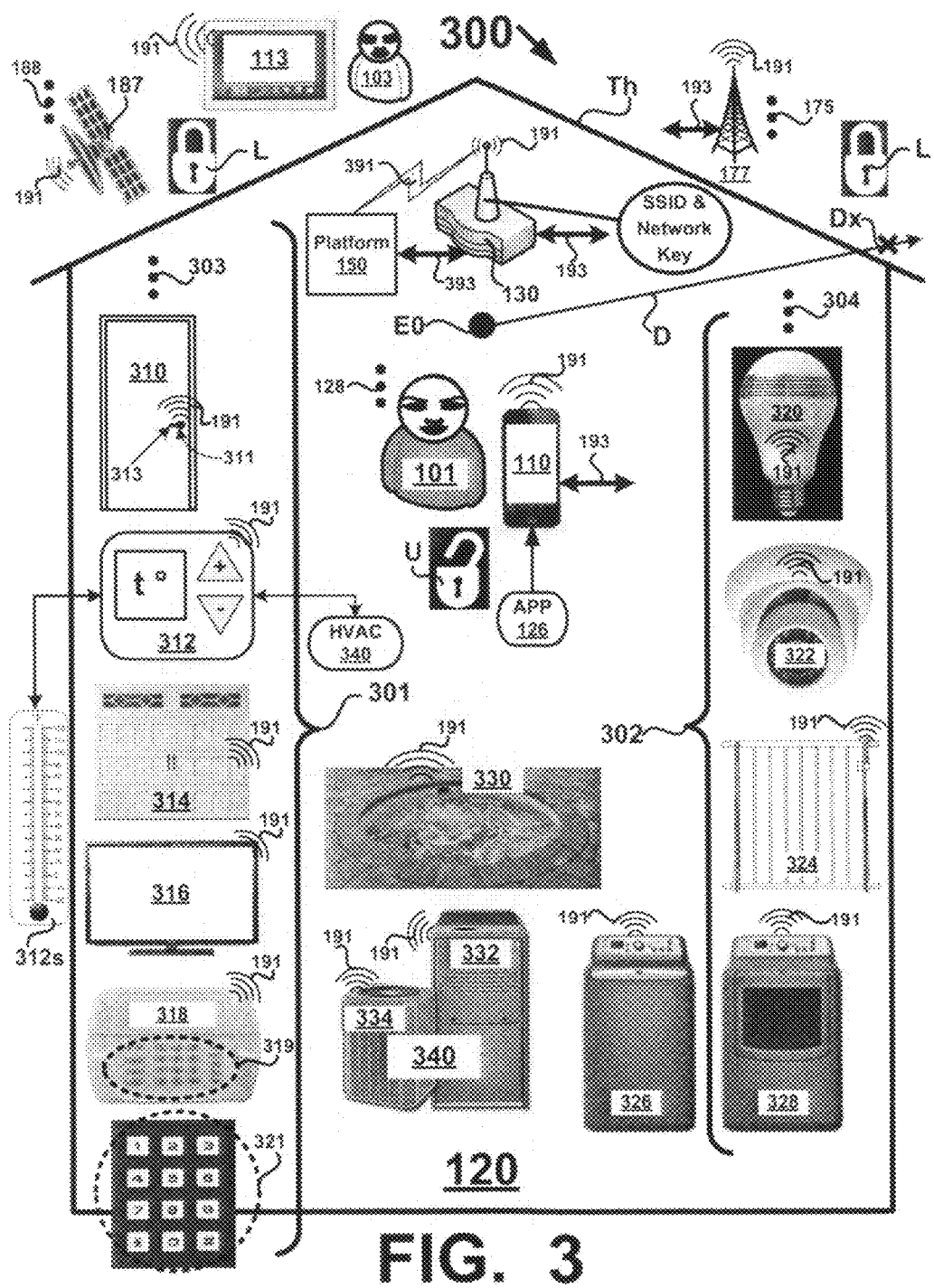
FIG. 3 depicts one example of automated functions at the rental unit that may be accessed by the traveler while the owner's access is blocked.

Moving on to FIG. 3 where one example 300 of automated functions at the rental unit 120 that may be accessed by the traveler while the owner's access is blocked are depicted. Non-limiting examples 301 and 302 of automated functions that may be made available for access by the traveler 101 in rental unit 120 may include but are not limited to door 310 access via wireless 191 communication with traveler device 110 or other wireless device or using a keypad 321 to enter an access code provided by the platform 150 upon verification of access credentials, an automated thermostat 312 which may be coupled with a HVAC system 340 and may include external sensor 312s for obtaining outdoor ambient conditions such a temperature, humidity, barometric pressure, wind speed and direction, a garage door 314 that may be open/closed via wireless 191 communications, a HDTV 316 for which access codes for remote controls or cable/pay content may be provided, a security system 318 which may be wirelessly 191 controlled and/or by provided security codes 319, automated lighting systems 320, security cameras 322, a gate 324 to a pool or other amenity, a washing machine 326 and dryer 328, HVAC system 340 including a heater 332 and AC unit 334, and a hot tub 330, just to name a few. The automated functions may be wirelessly enabled as denoted by 191 and/or may be enabled for wired 193 communication (not shown). Some automated functions may be interrelated such as security cameras 322 with security system 318 or hot tub 330 with automated thermostat 312, for example.

Transfer of automated functions to traveler 101 may include providing access to wireless access point 130 by providing wireless network key and SSID information needed to access 130. In FIG. 3, while traveler 101 is in possession of rental 120, owner 103 is locked-out L from access and traveler 101 has unlocked U access to the automated functions. In some examples, traveler device 110 may control access to the automated functions via wireless 191 link with the functions or via access point 130. While traveler device is within an allowable distance D from access point 130 as denoted by reference point E0, access may be unlocked U; however, if traveler device 110 moves to a point Dx that is outside the allowable distance, access may be locked L until the traveler device 110 moves back into a range inside the allowable distance D. Access codes, credential, and other information used to access the automated functions for rental unit 120 may be different for travelers 101 than for owner 103 and may be changed for each traveler 101 that rents unit 120. In FIG. 3, platform 150 may communicate via wireless 391 and/or wired 393 communications links with access point 130 or other types of portal computing devices, such as a bridge, to communicate (e.g., via access point 130) with devices having automated functions and/or with traveler device 110 to control or otherwise activate devices having automated functions and/or enable access (e.g., to lock L or unlock U) to traveler 101 via traveler device 110.

Figure 4:
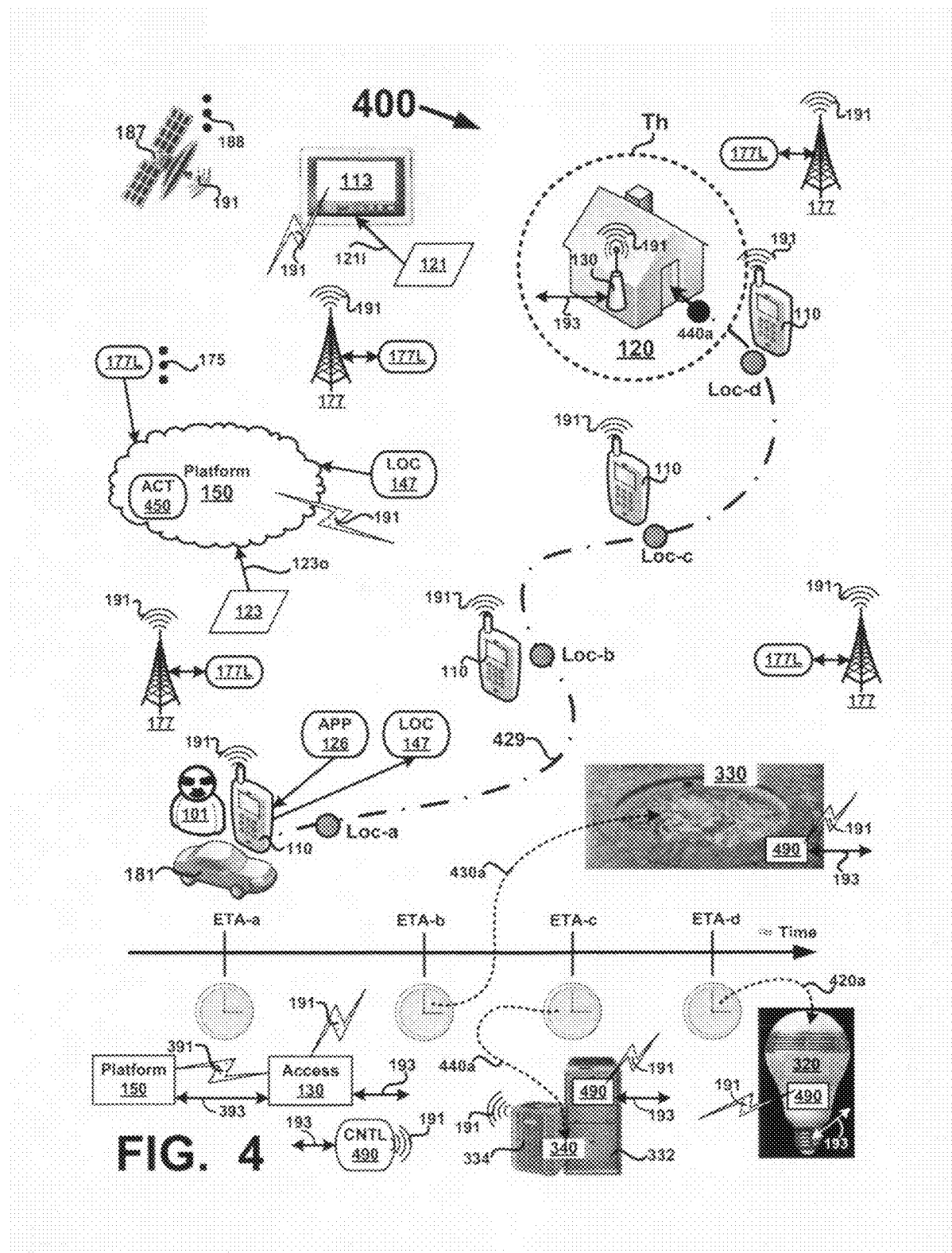
FIG. 4 depicts one example of access functions that may be activated in the rental unit prior to the traveler's arrival based on location, time, and distance.

Turning now to FIG. 4 where one example 400 of access functions that may be activated in the rental unit 120 prior to the traveler's 101 arrival at the rental unit 120, based on location, time, and distance or other factors are depicted. In FIG. 4, prior to traveler's 101 actual arrival 440a at the rental 120, the traveler 101 and his/her device 110 may travel a path 429 in car 181 in route to rental unit 120. Locations of the traveler device 110 along the path 429 are denoted as Loc-a-Loc-d. Each of those locations may also represent a distance from rental 120. Depending on the speed or velocity of car 181, an estimated time of arrival at the rental 120 or to one or more of the locations Loc-a-Loc-d will vary with the speed or velocity. Traveler data 1061 about traveler 101 or owner 103 information about traveler 101 may be used to determine which automated functions of rental 120 to activate (e.g., to turn on) prior to the traveler's 101 actual arrival 440a at the rental 120.

For example, at a time before actual arrival 440a, the owner may desire to have one or more of the automated lights 320 be activated (e.g., turn the lights 320 on) prior to arrival if the traveler 101 will be arriving at night time. For example, at an approximate estimated time of arrival of the traveler device 110 at location Loc-d denoted as ETA-d, a signal may be wirelessly communicated to trigger activation 420a of the lighting function to turn lights 320 on (e.g., interior and/or exterior lights 320). Due to changes in speed and/or route 429 taken, ETA-d may change (e.g., +/−Δt0 in FIG. 11). Therefore, platform 150 may adjust the ETA-d based on location data, changes in speed and/or direction of traveler device 110 so that the lights 320 aren't activated long before the traveler is near the rental 120, thereby preventing wasted energy consumption.

As another example, depending on the time of year, temperature, weather conditions, etc., the HVAC system 340 may be activated 440*a* prior to actual arrival 440*a* of the traveler 101, to heat or cool the rental unit 120. An estimated time ETA-c to a location Loc-c may be computed to activate the HVAC system 340 at a sufficient time before arrival 440*a* of traveler 101 so that a temperature of the rental 120 has had time to reach an appropriate set point, such as 68 degrees Fahrenheit for AC unit 334 when cooling is called for or 75 degrees Fahrenheit for Heater unit 332 when heating is called for.

As another example, hot tub 330 may be activated 430*a* at an ETA-b that allows sufficient time for the water in hot tub 330 to be heated or cooled to a desired temperature based on the exterior ambient conditions, which may be sensed by sensor 312*s*.

Location data 147, 177L, 1030 may be accessed by platform 150 and/or device 110 to modify ETA's to locations Loc-b-Loc-d as necessary so as to trigger activation 420*a*, 430*a*, 440*a* at a time that is not too early or too late to conserve energy or other resources, for example. Platform 150 may communicate via wired 393 and/or wireless 391 communications links with a portal computing device (e.g., access point 130) to trigger activation of one or more of the units 320, 330 and 340. Commands, signals, data or other information communicated by platform 150 may be received by access point 130 and communicated (191 and/193) to a control unit CNTL 490 in units 320-340, the control unit 490 configured to activate functions of units 320-340 and to communicate status data (e.g., unit is ON, unit is OFF, unit in standby mode, etc.), maintenance data (e.g., unit requires maintenance or repair), or other information with platform 150 and/or traveler device 110, for example.

Figure 5:
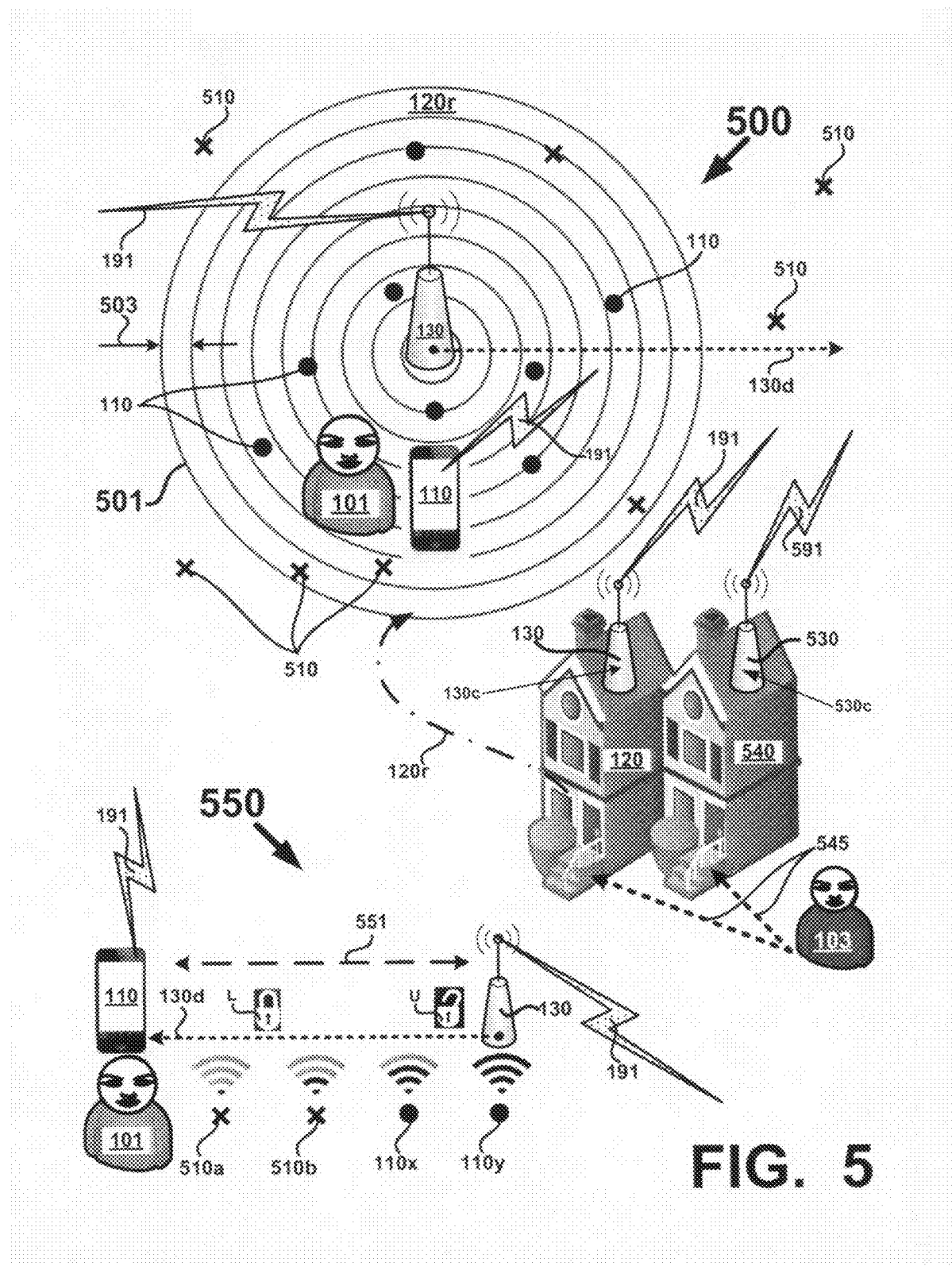
FIG. 5 depicts examples of an allowable location for an event.

Attention is now directed to FIG. 5 where examples 500 and 550 of an allowable location of an event (e.g., rental 120) are depicted. In example 500 the event 120 is a stay at a vacation rental unit 120 where guest 101 and his/her client device 110 are present. WiFi access point 130 (e.g., a portal computing device) is positioned in the rental unit 120 and includes access credentials 130*c*. Concentric circles 501 depict a radial distance 130*d* centered about access point 130 where a threshold for an allowable distance denoted as a black dot "●" for device 110, for an allowable location (e.g., event 120) may be used by a networked computing device (e.g., 153, 155, 159) to determine location data as described in reference to FIGS. 1, 3-4, 6 and 10-11, for example. For purposes of explanation a distance 503 between adjacent circles in 501 may be 3 meters, for example. Distances that are not an allowable distance are denoted by a "x" 510 and some of those distances may fall outside of circle 501.

For example, as a distance of the traveler device 110 increases along direction of the arrow for radial distance 130*r*, locations associated with "x" 510 may increase; whereas, as a distance of the traveler device 110 increases along direction of the arrow for radial distance 130*r*, locations associated with "●" 110 may increase.

In example 550, as the traveler device 110 moves closer to or further away from access point 130 as denoted by dashed line 551, a RF signal parameter may change as a function of distance along 130*d*. As an example, RSSI or RF signal strength associated with 1-bar 510*a* or 2-bars 510*b* for "x" 510 may be indicative of the client device 110 being outside the allowable distance. On the other hand, at closer distances to access point 130, RSSI or RF signal strength associated with 3-bars 110*x* or 4-bars 110*y* for "●" 110 may be indicative of the traveler device 110 being inside the allowable distance. Hardware, software, circuitry, RF systems or the like in access point 130 may include signal strength data indicative of a relatively strong signal (e.g., 4 to 5 bars), an adequate signal (e.g., 3 bars), or a relatively weak signal (e.g., one to two bars) in data 119. The signal strength data may be used by the platform 150 to determine location data. APP 126 may access systems of traveler device 110 (e.g., RF system) and include signal strength data in the data 119 and the signal strength data may be may be used by the platform 150 to determine location data. Access to automated functions of rental 120 may be blocked L for signal strength of 1 to 2-bars and unblocked for signal strength of 3 to 4-bars, for example.

Further to example 500, owner 103 may own 545 both rental units depicted (e.g., 120 and 540). An access point 530 with access credentials 530*c* in rental unit 540 may be detected by and may even be accessed by traveler device 110 of traveler 101. For example, another guest in 540 may give the access credentials for access point 530 to traveler 101. However, data 119 transmitted by traveler device 110 using access point 530 may not be authenticated due to the credential data in 119 not matching the access credentials assigned to rental 120. Use by traveler 101 of access point 530 to communicate data 119 to/from platform 150 may result in credential data not being authenticated and data communications access being denied. Other communications resources and/or portal computing devices may be used to determine location, such as cellular networks 177, other wireless access points 130 and the associated location data 177L generated by those devices. As one example, two or more cellular networks 177 may be used to locate traveler device 110 in location 120*r* using triangulation or other location techniques. Access points 130 positioned near or at events may be used to sense signals from traveler device 110 and determine a relative location of the traveler device 110.

Figure 6:
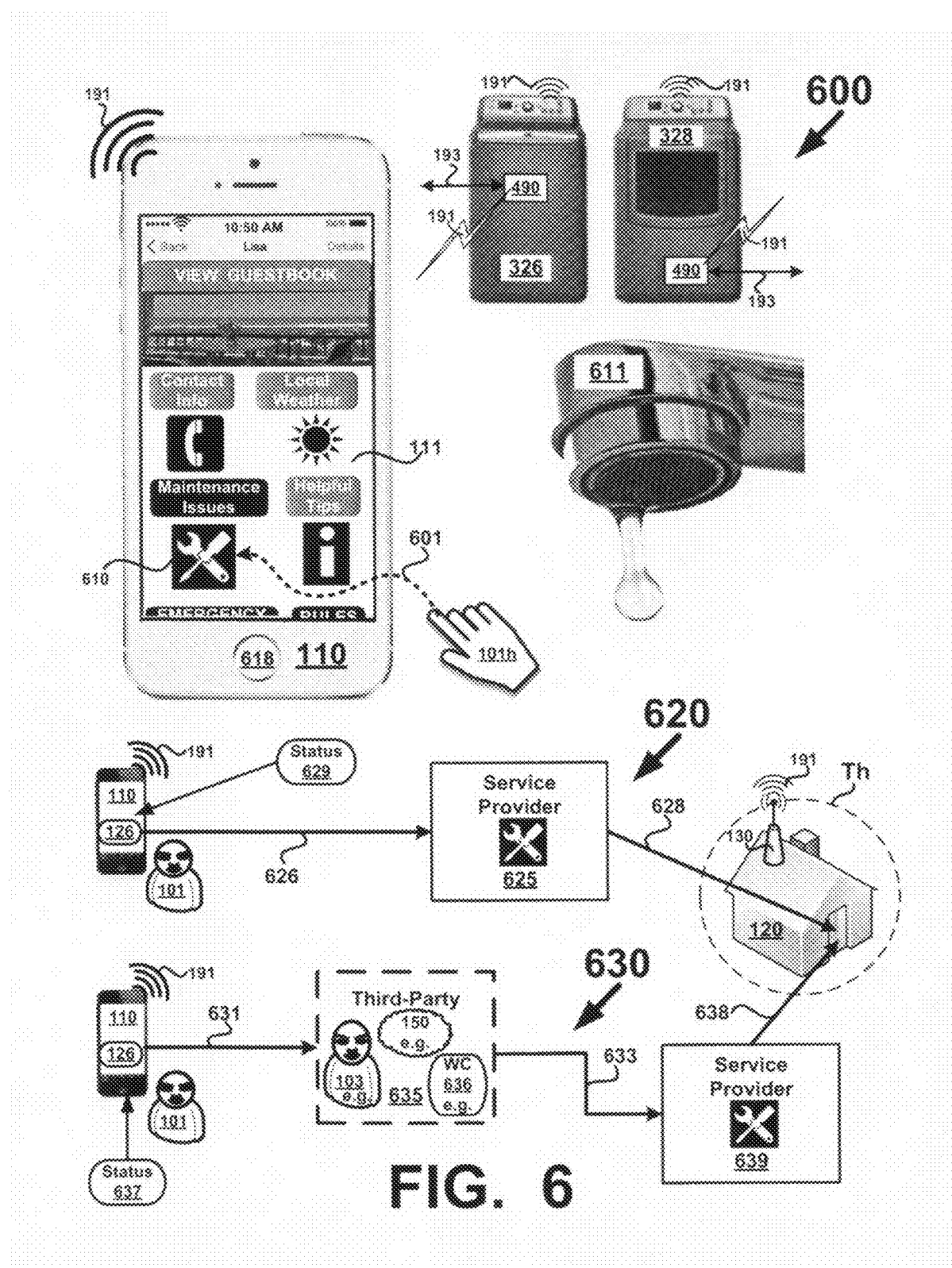
FIG. 6 depicts an example of an application configured to present a service request type on a display of a traveler computing device.

Referring now to FIG. 6 where an example 600 of an application configured to present a service request type 610 on a display 111 of a traveler computing device 110 is depicted. Now in FIG. 6, traveler 101 may encounter a maintenance issue in rental 120, such as a malfunctioning washer 326 or dryer 328, or a leaky faucet 611, for example. An application (e.g., APP 126) on traveler device 110 may present on a display 111 (e.g., a touch screen) of the device 110 an icon, image, graphic, or other user interface information that may be selectable 601 (e.g., by a finger of a hand 101*h* of traveler 101). A maintenance issue may be communicated 191 wirelessly to traveler device 110 and/or platform 150 by control unit 490 and data representing a service request type (e.g., plumbing, HVAC, electrical, etc.) needed by the malfunctioning unit (e.g., 326 or 328) may be presented on the display 111. In some examples, the maintenance issue may not be one that has a dedicated icon, and a generic icon, such as 610 may be presented. Traveler 101 may use a GUI keyboard of device 110 to enter text and/or menu selections to describe the maintenance issue.

In example 620, activation 601 of the icon 610 may cause APP 126 to communicate a service call 626 to a service provider 625 for the service request type needed, which for purposes of explanation will be the leaky faucet 611. Accordingly, service provider 625 skilled in plumbing issues may be dispatched 628 to unit 120 to repair the leaky faucet 611. A status message 629 may be communicated to device 110 to notify the traveler 101 when the service provider 625 will arrive at the unit (e.g., in case the traveler does not wish to be in unit 120 during repairs). Status message 629 may include an estimated repair time. The status message 629 may inform traveler when repairs are completed and/or apprise the traveler 101 that the service provider 625 has vacated the rental unit 120. The status message 629 may include other information and the foregoing are non-limiting examples.

In example 630, activation 601 of icon 610 may cause APP 126 to communicate a service call 631 to a third party 635. The traveler may not be aware that the service call is being communicated to a party that is not the service provider for the service request type needed. In some examples, the third party 635 may be the platform 150. In other examples, the third party 635 may be the owner 103. In yet other examples, the third party may be a warranty company 636 (e.g., under contract to the owner 103 or a property management company that oversees rental 120). The communication to the third party 635 may be transparent to traveler 101 and third party 635 may contact 633 a service provider 639 who is subsequently dispatched 638 to rental unit 120 to effectuate repairs. As described above, traveler device 110 may receive a status message 637. In the case where the third party 635 is the owner 103, the APP 126 may be configured to contact owner 103 in order for owner 103 to select a preferred service provider based on cost, location of the rental unit 120, type of repair needed, etc. Service provider (625, 639) may be granted limited access to automated functions of rental 120 (e.g., by signals from a computing device of the service provider that is positioned within the threshold Th).

Figure 7:
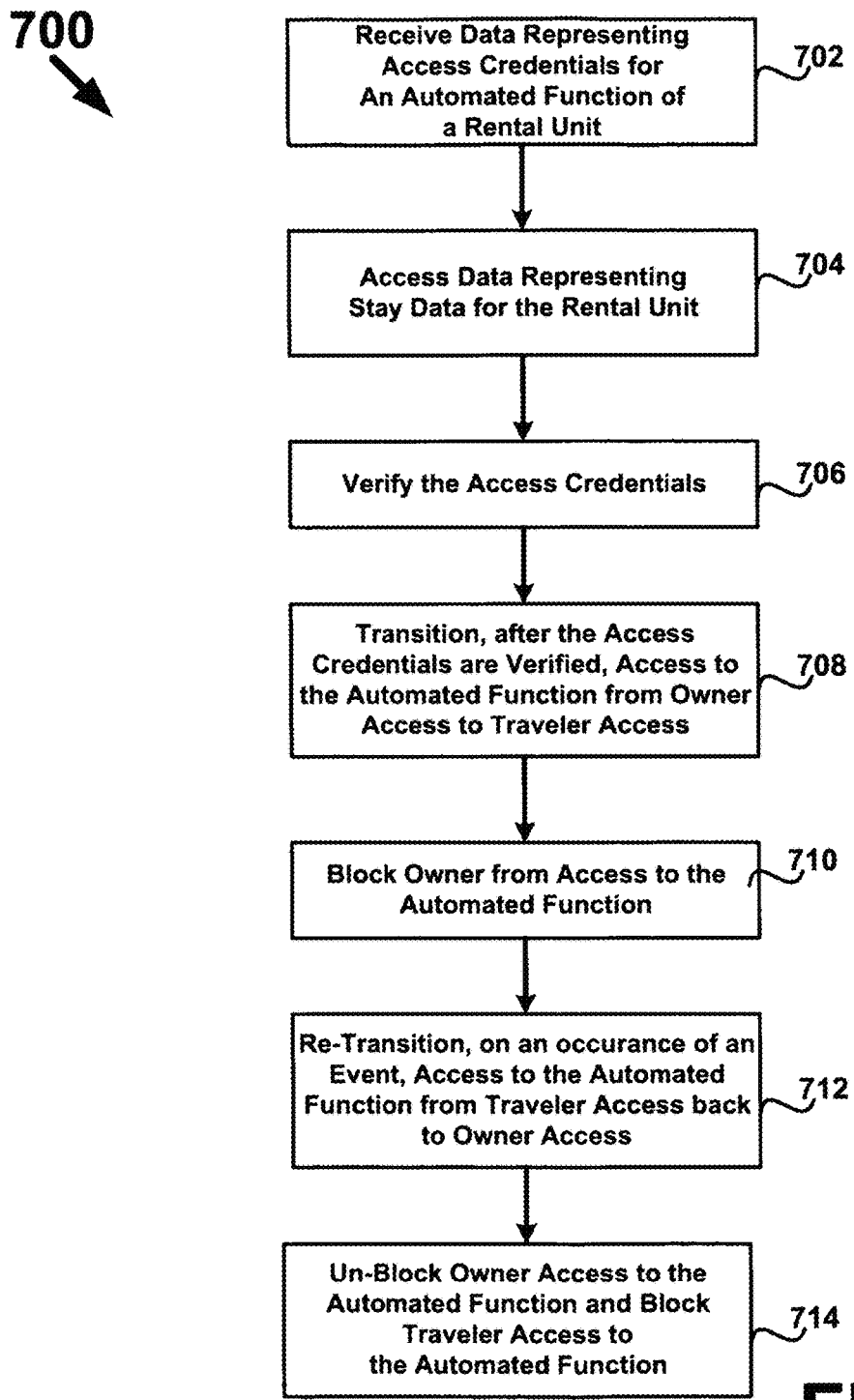
FIG. 7 depicts an example of a flow diagram for transitioning access to automated functions from an owner to a traveler.

Turning now to FIG. 7 where an example of a flow diagram 700 for transitioning access to automated functions from an owner to a traveler is depicted. Platform 150 may perform one or more of the stages depicted in FIG. 7 using one or more hardware and/or software systems and/or functions. At a stage 702 data representing access credentials for an automated function of a rental unit (e.g., one or more automated functions of unit 120) may be received. For example, communications interface 1080 of FIG. 10 may receive the data.

At a stage 704 data representing stay data for a stay at the renal unit may be accessed (e.g., from stay data 1066). At a stage 706 the data representing the access credentials may be verified (e.g., by comparing with data accessed from credential data 1064). At a stage 708, after the data representing the access credentials has been verified, access to the automated function may transition from owner access to traveler access. (e.g., owner 103 is locked-out L of access and traveler 101 has unlocked U access to the automated function(s)).

At a stage 710 owner access to the automated function may be blocked (e.g., credentials changed, codes changed, etc.) during the stay of traveler 101. At a stage 712, on occurrence of an event, such as the traveler 101 departing the rental at the end of the stay (e.g., check-out time) or an emergency at the rental 120, access to the automated function may re-transition back to owner access from traveler access (e.g., credentials changed, codes changed, etc.). At a stage 714, owner access to the automated function may be unblocked and traveler access to the automated function may be blocked.

Figure 8:
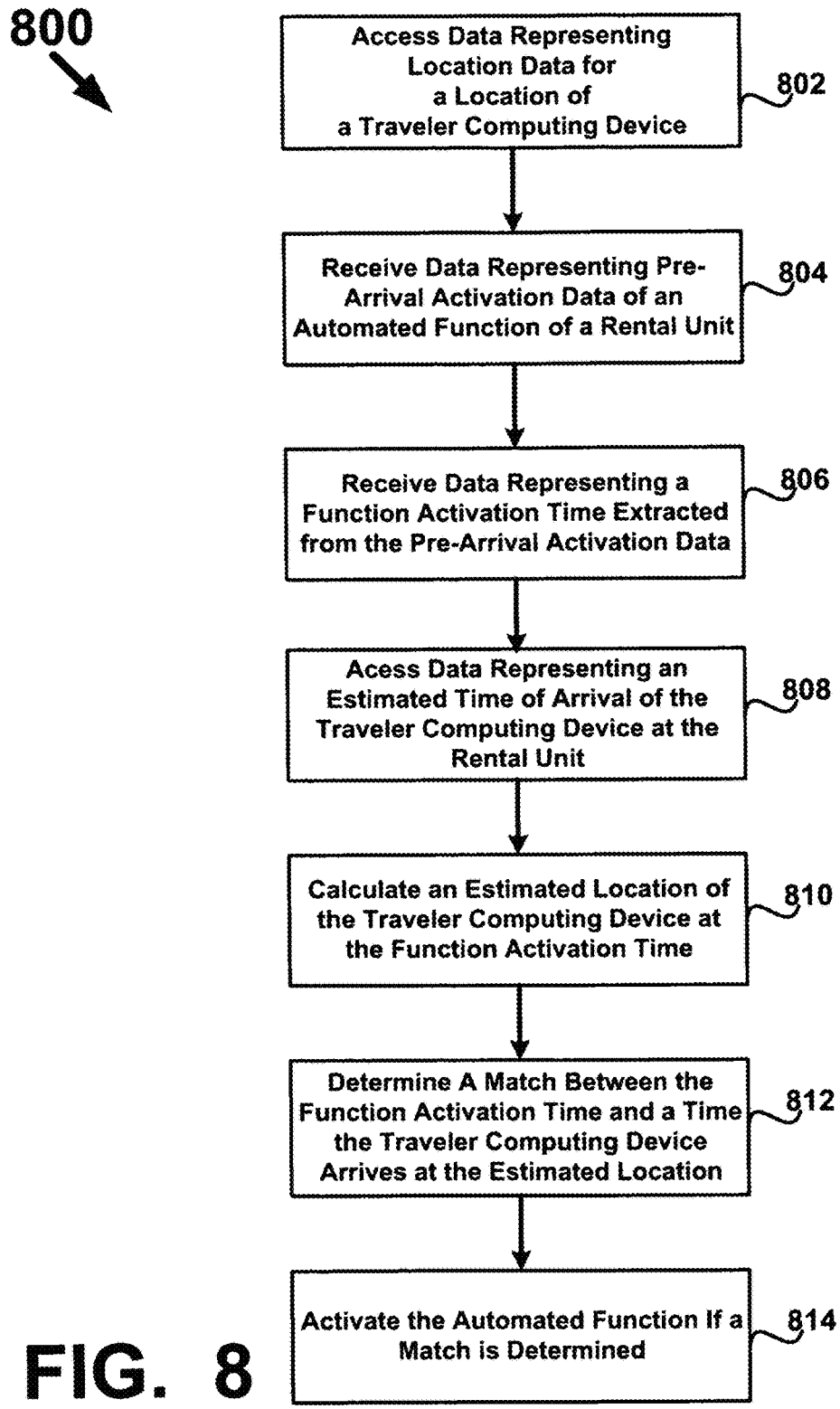
FIG. 8 depicts one example of a flow diagram of pre-arrival function activation.

Moving to FIG. 8 where one example of a flow diagram 800 of pre-arrival function activation is depicted. Platform 150 may perform one or more of the stages depicted in FIG. 8 using one or more hardware and/or software systems and/or functions. At a stage 802 data representing location data for a location of a traveler computing device (e.g., 110) may be accessed (e.g., location data 1030, 177L, 147). At a stage 804 data representing pre-arrival activation data of an automated function of a rental unit (e.g., 120) may be received. At a stage 806 data representing a function activation time extracted from the pre-arrival activation data may be received. At a stage 808 data representing an estimated time of arrival (ETA) of the traveler computing device at the rental unit (e.g. 120) may be received. At a stage 810 an estimated location of the traveler computing device at the function activation time may be calculated (e.g., by 110). At a stage 812 a match between the function activation time and a time the traveler computing device reaches the estimated location may be determined. At a stage 814 the automated function may be activated (e.g., turned ON) if the match is determined.

Figure 9:
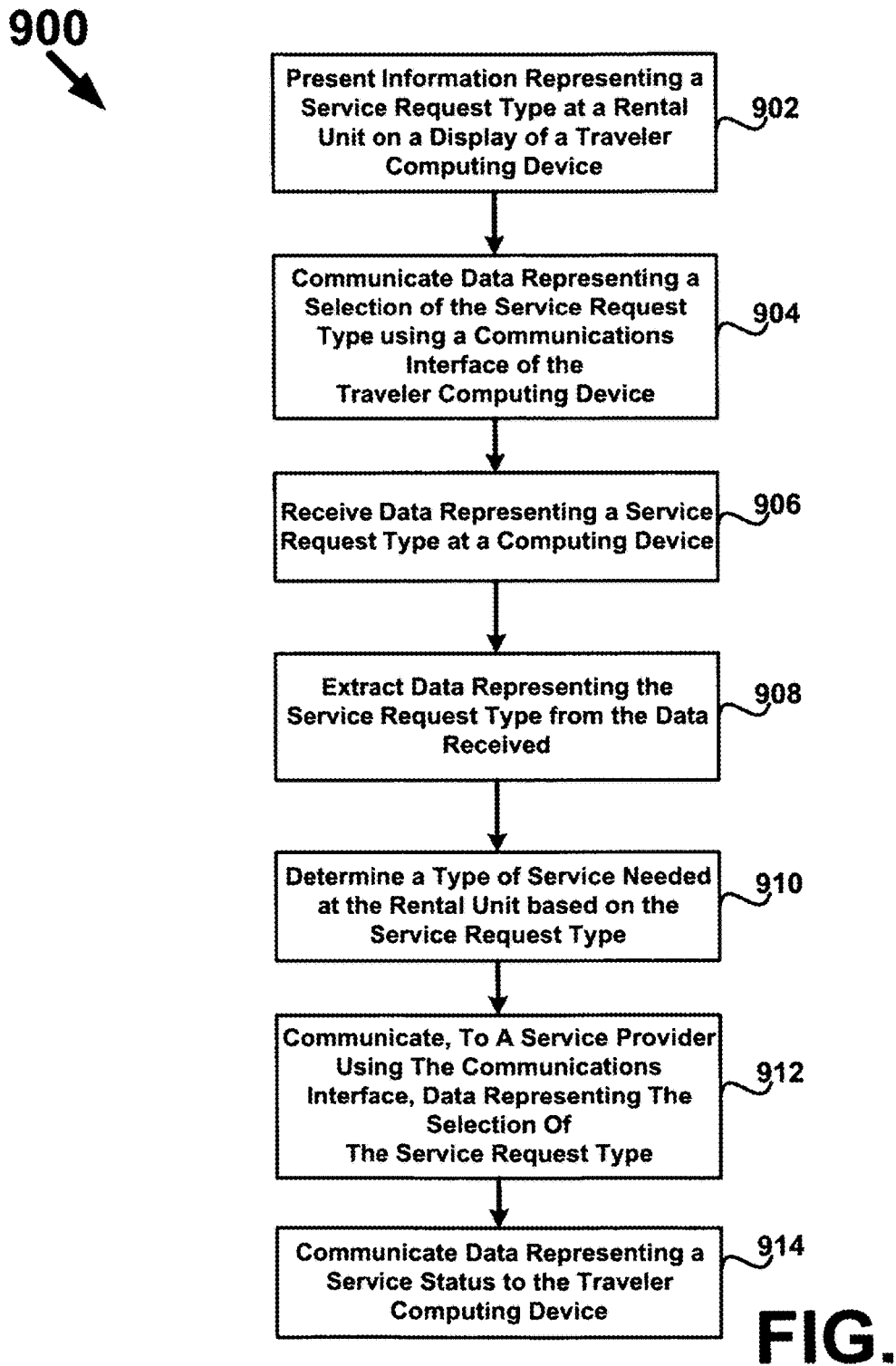
FIG. 9 depicts one example of a flow diagram for a service request type.

Attention is now directed to FIG. 9 where one example of a flow diagram 900 for a service request type is depicted. At a stage 902 information representing a service type request (e.g., icon 610) at a rental unit may be presented on a display (e.g., 111) of a traveler computing device (e.g., 110). At a stage 904 data representing a selection of the service request type may be communicated by a communications interface of the traveler computing device. At a stage 906 data representing a service type request may be received at a computing device (e.g., 113 and/or 150). At a stage 908 data representing the service type request may be extracted from the data received. At a stage 910 a type of service needed at the rental unit (e.g., 120) may be determined based on the service request type (e.g., plumbing, electrical, appliance, etc.). At a stage 912 data representing the selection of the service request type is communicated (e.g., 628, 633) to a service provider (e.g., 625, 639) using the communications interface of the traveler computing device. At a stage 914 data representing a service status (e.g., 629, 637) is communicated to the traveler computing device.

Figure 10:
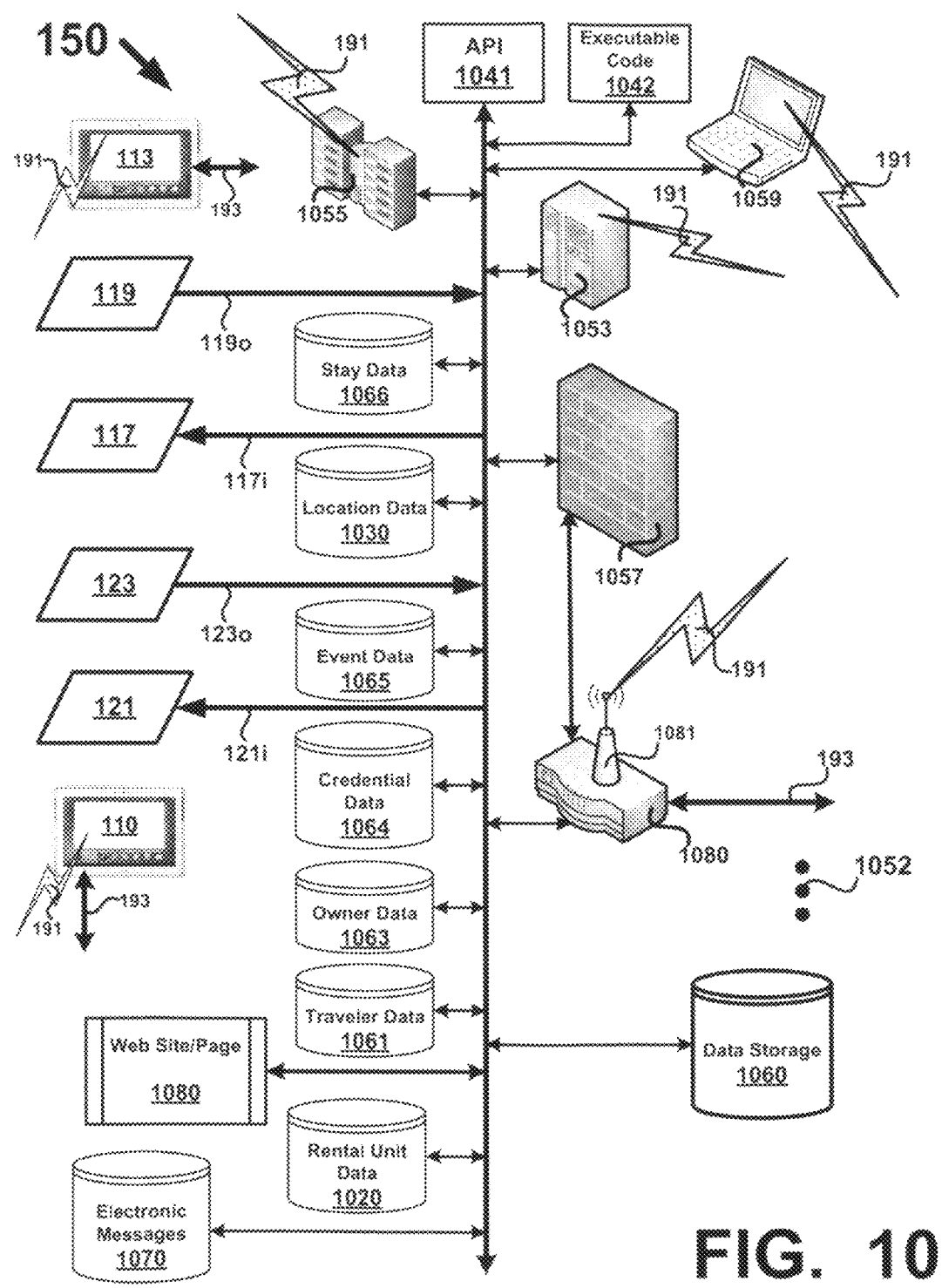
FIG. 10 depicts one example of a platform configured to perform temporary control over access functions of a property.

Reference is now made to FIG. 10 where one example of a platform 150 configured to perform temporary control over access functions of a property is depicted. Platform 150 may be a platform that includes a communications interface and data storage and processing resources in communication with the communications interface using wired 193 and/or wireless 191 communications links. Platform 150 may be in wired 193 and/or wireless 191 communications with other devices and systems, including but not limited to external resource 199 and its associated resources (192, 194), traveler device 110, owner device 113, and other computing devices, just to name a few. Platform 150 may include resources in communications with one another, that may include but is not limited to an application program interface (API) 1041, executable code 1042, one or more laptop computers 1059, one or more servers 1053, a communications interface 1080 that may include wireless 191 (e.g., a wireless 1081 access point), and wired 193 links, firewall 1057, one or more server farms 1055, data storage 1060, location data 1030 which may include location history data from traveler device 110 (e.g., a location history data base), event data 1065 (e.g., for events in region 120r which may include the rental unit), credential data 1064 (e.g., WiFi access point network name and SSID for access point 130, key codes, and other access credentials), owner data 1063 (e.g., owner contact information, emergency contact information, rental unit policies, etc.), traveler data 1061 (e.g., traveler preferences, information on traveler device(s) 110, contact information, email address, addresses for other electronic media/accounts, etc.), stay data 1066 (e.g., beginning/ending dates and/or times for a stay, rental location, rental automated functions, rental amenities, etc.), rental unit data 1020 (e.g., amenities, geographic location, wireless access point 130 information, rules, polices, automated equipment/functions, etc.), and electronic messages 1070. In some examples, data storage 1060 may include one or more of the other above described data storage categories. In other examples, data storage resources accessed by platform 150 may be external to platform 150 (e.g., positioned in external resource 199). One or more of the flows depicted in FIGS. 7-9 may be implemented using hardware, circuitry, executable code 1042 and/or API 1041, for example. For purposes of explanation, a computing resource (e.g., 1053, 1055, 1059) depicted in FIG. 10 may be referred to as a networked computing device and a data storage resources may be referred to as data storage or a data store. For example, data 119 may be received by networked computing resource 1053 via communications interface 1080. In some examples, a computing device that transmitted the data 119 may be referred to as a traveler device (e.g., 110) or a portal computing device (e.g., 130, 177). As another example, data 123 from owner device 113 may be received by networked computing resource 1053 via communications interface 1080 and the data 123 may include credential data for the owner device 113, that once verified, allows data communications access to platform 150.

Traveler device 110 and/or owner device 113 may communicate (191, 193) with platform 150 via a Web Site/Web Page 1080 (e.g., using a browser or application on a laptop, PC, wireless device, smartphone, pad, tablet, touch screen device, etc.). Information (117, 119, 121, 123) may be viewed, entered, transmitted, received, or otherwise communicated (191, 193) between platform 150 and another device (e.g., 110, 113, etc.) using Web Site/Page 1080. Data associated with rental unit 120 or other events in region 120r may be communicated via Web Site/Page 1080. Platform 150 may require access be granted to a device (e.g., 110, 113, etc.) prior to allowing data communication with the platform 150 via Web Site/Page 1080. Traveler device 110 may include a biometric sensor (e.g., see fingerprint scanner 118 in FIG. 6) to verify access credentials for data communications between platform 150 and traveler device 110, for example and/or between platform 150 and owner device 113, for example.

Location data 1030 may include locations (e.g., GPS data and/or other location data) associated with events (e.g., rental unit 120, events in 120r) and locations around events (e.g., in approximately the same locale as an event). Examples of location around an event may include but are not limited to a park across the street from an event, a cafe of coffee shop down the street from an event, etc. Examples of owner locations may include location data associated with use of the owner device 113, such as location data from cellular networks (e.g., in the city or state the owner or a rental property or other types of events lives in), WiFi networks, WiMAX networks, etc.

Event data 1065 may include data for the stay at rental unit 120, an entertainment venue, a bar, a grocery store, a bakery, goods, services, business, restaurants, etc. that may be the primary event for traveler 101 or may be associated with activities the traveler 101 partakes in during his/her stay at the primary event (e.g., the stay at the rental 120).

Location data 1030 may include a location history data base. The location history data base may include location data tracked and stored over time based on various locations visited by traveler 101 with traveler device 110 that includes or has access to internal/external sources of location data, such as satellite 187, access points 130, cellular networks 177, etc. Validation of location of a traveler 101 may include accessing data in location data 1030, the location history data base included in 1030, or both. In some examples, a computing device that communicates the data 119 (e.g., device 110) may include location history data base (e.g., 147) which may include the same or different data than the location history data base in 1030. In some examples location data in one of the location history data bases may be used to update and/or replace location data in another location history data base.

Credential data 164 (e.g., access credentials, user name, password, etc.) may be a data store where access data is retained for various events, owner properties, etc. For example, credential data 164 may include credentials for WiFi access points (e.g., 130) in a rental unit, in owner properties (e.g., 120, 136), businesses that may be promoted by the owner 103 or by an agent acting on behalf of the owner, etc. Other forms of credentials may be included in credential data 164, such as access credentials for traveler devices (e.g., 110), locks on doors needed to gain access to a rental property or other protected area associated with a stay at an event (e.g., event 120), for example.

Electronic messages 1070 may be a data store for incoming and/or outgoing electronic messages, such as emails, push notifications, push events, and electronic messages generated by one or more of platform 150, owner 103, or traveler 101, for example. Electronic messages 1070 may include data in 117, 121, 119 and 123, for example. Electronic messages 1070 may be presented on a display of device 110, 113, or web site/page 195, for example.

Rental unit data 1020 may include information on a rental unit (e.g., event 120, 136) that may be accessed by traveler 101, such as amenities, rental policies (e.g., no smoking, no pets), parking instructions/locations/restrictions, maps, address information, electronic devices in the rental unit, appliances, maintenance contact information, owner information, emergency information, policies for use of facilities (e.g., swimming pools, workout room, club house, etc.), just to name a few.

Owner data 1063 may include data about owners (e.g., 103), such as property addresses, owner address and contact information, email accounts, account information for a vacation rental agency the owner uses to manage stays by guests, travelers, users, data on owner devices 113 (e.g., MAC address or other forms of device ID, etc.).

Traveler data 1061 may include data about travelers (e.g., 101), such as addresses and contact information, email accounts, traveler demographics, data on traveler devices 110 (e.g., MAC address or other forms of device ID, etc.), financial accounts for deposits, payments, refunds, etc.

Stay data 1066 may include data for an event such as stay dates, check-in/check-out times/dates, event address, maps to events, directions to events, event categories for different types of events (e.g., vacation rental events, restaurant events, casino events, etc.). Verification of access credentials for a traveler, transitioning of automated functions from owner access to traveler access or both, to a rental unit (e.g., rental unit 120) may be conditioned on an event represented by data included in the stay data, such as check-in/check-out times/dates, for example. As one example, presenting correct access credentials prior to a check-in time/date included in the stay data may block traveler access to automated functions because the travelers stay at the rental unit has not yet begun.

Data storage 1060 may be used as a data store that may be accessed by other components internal to and/or external to platform 150. Platform 150 may include more or fewer resources than depicted in FIG. 10 as denoted by 1052.

Platform 150 may share data processing and/or data storage with external devices, such as traveler devices 110, owner devices 113, external resource 199, for example. As one example, hardware systems (e.g., see FIGS. 2 and 11) circuitry, sensors 230, clock 240) of traveler device 110 may perform calculations, signal processing or other electronic functions and communicate data (e.g., via 119) to platform 150. For example, location data resources of device 110 in conjunction with circuitry that receives signals from sensors 230 and/or clock 240 may be used to determine a rate of speed and direction (e.g., velocity) of traveler device 110, and data from that determination may be communicated (e.g., via 191 and 119) to platform 150. The data may be used to calculate whether or not a traveler 101 is heading toward and event in 120*r* or away from and event in 120*r*. The data may be used to determine if the traveler 101 will arrive at an event in 120*r* within a specified time window set for the event or will enter into the threshold distance (e.g., Th) for the event (e.g., a stay at rental unit 120) within a specified time window based on a velocity of the traveler 101 (e.g., as sensed by motion of traveler device 110).

Figure 11:
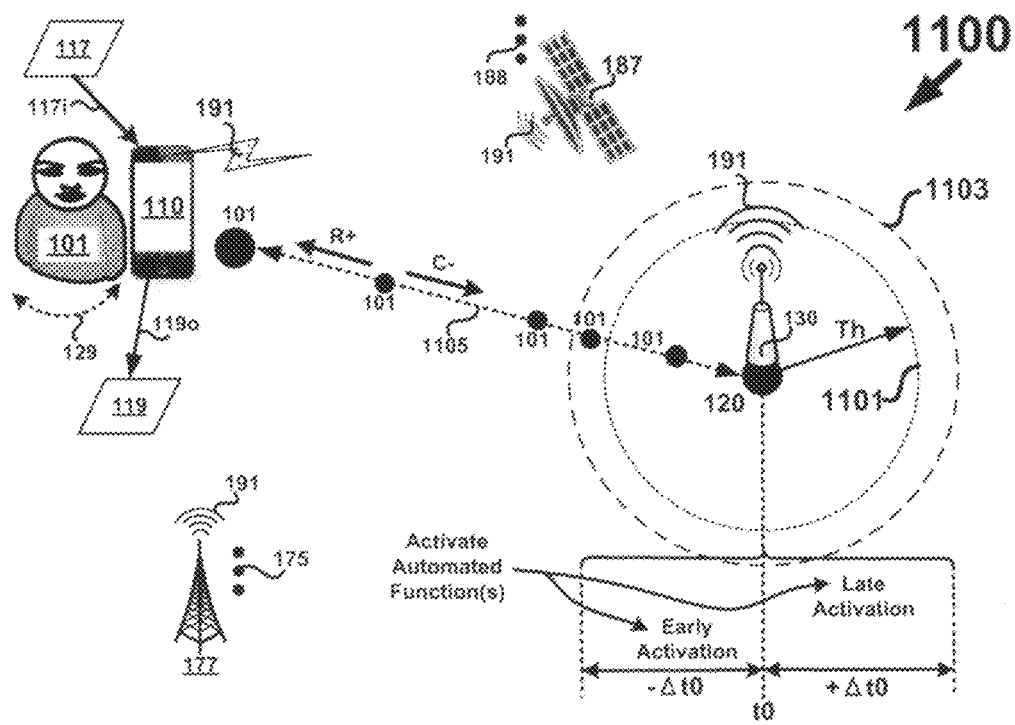
FIG. 11 depicts examples of determining traveler location relative to a rental unit via a traveler's computing device.
Figure 11:
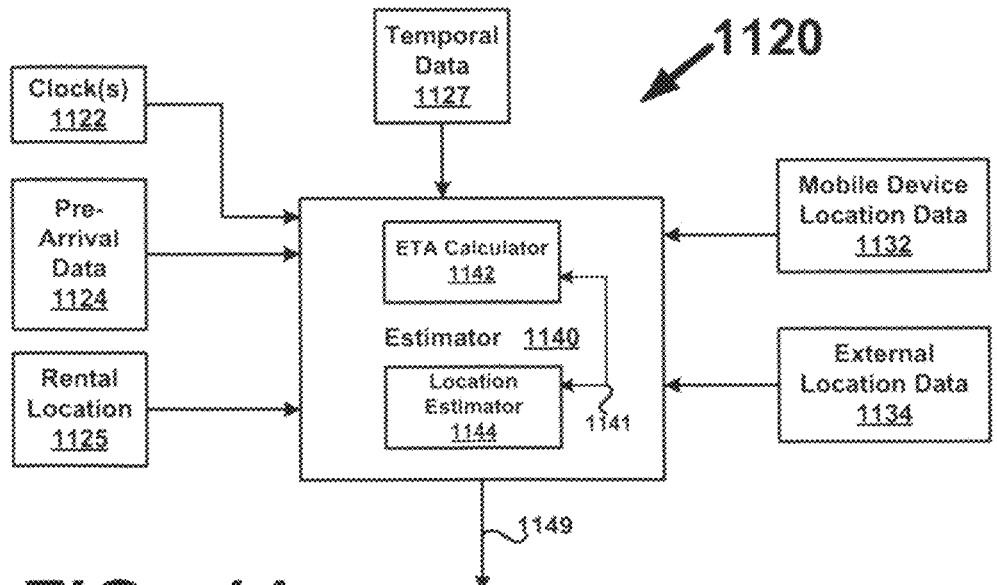

Attention is now directed to FIG. 11 where an example 1100 of tracking temporal and location data for a traveler device 110 and an example of a block diagram 1120 for an estimator are depicted. In example 1100 an event 120 (e.g., a rental unit) has a threshold Th for an allowable distance for an allowable location for the event 120. For purposes of explanation, threshold Th may define as circle 1101 centered about event 120 such that the traveler device 110 being on or in the circle 1101 positions the traveler 101 within the threshold Th for the event 120. Dashed line 1105 represents a distance of the traveler device 110 from the event 120 and that distance may change as the traveler device 110 moves in a direction away from the event 120 as denoted by R+ (e.g., distance is receding) or traveler device 110 moves in a direction towards the event 120 as denoted by C− (e.g., distance is closing). As one example, if distance between the traveler device 110 and the event 120 is closing C−, then traveler 101 may be moving 129 in the geographic location 120*r* for the event 120 in a direction towards the event 120 as denoted by 101*t* moving from the left of the drawing sheet to being inside the circle 601. As another example, if the distance between the traveler device 110 and the event 120 is receding R+, then traveler 101 may be moving 129 in the geographic location 120 for the event Et in a direction away from the event 120 as denoted line by 101*t* moving further to the left of the drawing sheet on line 607.

Location data from traveler device 110 and/or from sources external to traveler device 110 may be accessed to calculate the approximate distance between the traveler device 110 and the event 120, the rate of closure C− if the traveler device 110 is moving towards the event 120, the rate of recession R+ if the traveler device is moving away from the event 120, for example. Temporal data from the traveler device 110 (e.g., from a clock or oscillator in device 110) and/or an external source (e.g., 150, 130, 177) may be used in determining speed of closure C+ or speed of recession R− and/or a velocity of traveler device 110 (e.g., speed and direction) relative to the event 120 (e.g., a velocity vector V).

The temporal data and location data may be used to determine an estimated time of arrival of the traveler 101 at the event 120. For example, a time t0 may be a time associated with the event 120, such as a check-in time of 3:00 pm. Time windows −Δt0 and +Δt0 may represent times prior to time t0 (e.g. where −Δt0 may mean arriving early) or after (e.g., where +Δt0 may mean arriving late) where the traveler 101 is estimated to arrive within the threshold Th. In some examples, there may be some tolerance to the deltas +/−Δt0 for the arrival times. Location tracking data (e.g., from terrestrial sources 177 and/or orbital sources 187) may be used to determine device 110 speed and/or direction and temporal data may be used to determine an estimated time of arrival (ETA) at the event 120 (e.g., at a time t0 or a time relative to t0 as +/−Δt0). In some examples, event 120 may be in data received (e.g., 117) by device 110 and device 110 may use internal resources (e.g., clock 240, sensors 230, circuitry, location data, location history data) to calculate speed, velocity, ETA and other parameters associated with moving towards C− or away R+ the event 120.

In example 1100, the traveler 101 may not have notification of the or be able to take action on access functions for event 120 until the traveler device 110 is within some predetermined distance around the event 120 as denoted by dashed line 1103. Platform 150 may track device 110 and upon determining the device 110 is at least within the predetermined distance 1103, initiate data communications with device 110 for purposes of temporary control over access functions for rental unit 120 and/or pre-arrival activation of one or more functions in the rental unit as described in reference to FIG. 4. Threshold Th may be 50 meters or less, and predetermined distance 1103 may be a larger distance, such as one or more kilometers, for example.

As estimated arrival time at rental unit 120 changes (e.g., due to traffic, detours, sightseeing, etc.) activation of automated events may still occur at a time relative to the time t0, such as traveler 101 arriving at 120 early as denoted by −Δt0 or traveler arriving late +Δt0. For example, in FIG. 4, if the pre-arrival function to be activated before the traveler 101 arrives at rental unit 120 is turning on lights 320, if the traveler 101 is arriving early, then the lights 320 may be turned on before time t0 somewhere in the −Δt0 window; whereas, if the traveler 101 is arriving late, then the lights 320 may be turned on after time t0 somewhere in the +Δt0 window. Although line 1105 is depicted as being a straight line, the path take to event 120 need not be straight or linear and may be arcuate and/or circuitous with many bends, curves, etc. The +/−Δt0 may be applied to other times such as those depicted in FIG. 4, such that ETA-a-ETA-d may have +/−Δt times associated with them based on traveler device 110 changes in speed/velocity and location. As one example, hot tub 330 may be activated at time t0 if traveler 101 arrives about at the 3 pm check-in time. However, the hot tub 330 may be activated earlier (−Δt0 window) if the traveler 101 arrives to the rental 120 earlier than scheduled, or may be activated later (+Δt0 window) if the traveler 101 arrives to the rental 120 later than scheduled. Location data (1132, 1134) may be tracked or otherwise updated or refreshed in real-time or near real-time to track progress of traveler 101 and his/her device 110 towards or away from the rental 120 or some other event in region 120*r*.

In block diagram 1120 an estimator 1140 is coupled with mobile device location data 1132, data and/or signals from one or more clocks 1122, stay data 1124 (e.g., from stay data 1066), target location 1125 (e.g., geographical location of rental unit 120 from rental unit data 1020, stay data 1066, event data 1065, etc.), external location data 1134 (e.g., from 117, 187, etc.), and temporal data 1127 (e.g., from stay data 1066, event data 1065).

Estimator 1140 may include an estimated time of arrival (ETA) calculator 1142 (e.g., circuitry, software or both for estimating time of arrival based on input to Estimator 1140). Location data from 1132, 1134 or both may be used to determine a current location of traveler device 110 relative to the target location data 1125. Estimator 1140 may also include a distance estimator 1144. Distance estimator 1144 and ETA estimator 1142 may be electrically coupled 1141 and may transmit and/or receive signals and/or data between each other operative to calculate ETA or estimated distance. Distance estimator 1144 may take as inputs a current location of traveler device 110 (e.g., from 1132, 1134) relative to the target location data 1125 (e.g., for event 120) and estimate a distance between the traveler device 110 and the target location. Distance estimator 1144 may calculate a rate of change in location data (e.g., from 1132, 1134) to determine a speed (scalar) or velocity (vector) for the traveler device 110 (e.g., as traveler 101 moves 129 through region 120*r* by car 181, etc.). ETA estimator may use the velocity and/or speed to determine the ETA to the target location or to one or more other locations such as locations Loc-a-Loc-d in route to location 120 as depicted in FIG. 4.

Although the foregoing examples have been described in some detail for purposes of clarity of understanding, the above-described conceptual techniques are not limited to the details provided. There are many alternative ways of implementing the above-described conceptual techniques. The disclosed examples are illustrative and not restrictive.

What is claimed is:

1. A computer-implemented method, comprising:
   under control of a computing device configured to execute specific computer-executable instructions,
   receiving access credentials for an automated function of a rental unit;
   accessing stay data for the rental unit;
   verifying the access credentials;
   in response to verifying the access credentials:
      transitioning access to the automated function from owner access to traveler access;
      blocking owner access to the automated function; and
      storing data representing at least:
         traveler access to the automated function, and
         blocked owner access to the automated function; and
   in response to the occurrence of an event, transitioning access to the automated function from traveler access to owner access.

2. The computer-implemented method of claim 1, wherein the occurrence of the event corresponds to the occurrence of passing at least one of a check-out time or a check-out day.

3. The computer-implemented method of claim 1, wherein the event corresponds to an emergency at the rental unit.

4. The computer-implemented method of claim 3 further comprising:
   unblocking owner access to the automated function until the emergency at the rental unit is ended.

5. The computer-implemented method of claim 1, wherein the access credentials include device identification data for a traveler computing device that communicated the access credentials.

6. The computer-implemented method of claim 1 further comprising:
   receiving location data for a traveler computing device, the location data indicating that the traveler computing device is positioned within a threshold distance from the rental unit.

7. The computer-implemented method of claim 6, wherein the location data comprises at least one of an address associated with the traveler computing device or a radio frequency signal parameter of the traveler computing device.

8. The computer-implemented method of claim 1 further comprising:
   retaining owner access to automated functions of an additional rental unit until occurrence of a second event; and
   transitioning access to the automated functions of the additional rental unit from owner access to traveler access upon occurrence of the second event.

9. The computer-implemented method of claim 8, wherein the occurrence of the second event comprises verifying access credentials for the additional rental unit.

10. The computer-implemented method of claim 1, further comprising:
    receiving, by a device located within the rental unit, identifying information from a traveler computing device, wherein the identifying information is associated with at least one of a traveler or the traveler computing device, wherein receiving the access credentials is based at least partly on the identifying information; and
    determining that the traveler computing device is within a threshold distance of the rental unit, wherein the access credentials are verified in response to determining that that the traveler computing device is within the threshold distance of the rental unit.

11. The computer-implemented method of claim 1 further comprising:
    receiving location data for a traveler computing device;
    receiving a function activation time of the automated function;
    determining an estimated time of arrival of the traveler computing device at the rental unit;
    adjusting the function activation time based at least in part on the estimated time of arrival of the traveler computing device at the rental unit to result in an adjusted function activation time; and
    activating the automated function at the adjusted function activation time.

12. A computer-readable, non-transitory storage medium storing computer executable instructions that, when executed by a computing system, cause the computing system to at least:
    receive access credentials for an automated function of a rental unit;
    access stay data for the rental unit;
    verify the access credentials;
    in response to verifying the access credentials:
       transition access to the automated function from owner access to traveler access;
       block owner access to the automated function; and
       store data representing at least:
          traveler access to the automated function, and
          blocked owner access to the automated function; and
    in response to an occurrence of an event, transition access to the automated function from traveler access to owner access.

13. The computer-readable, non-transitory storage medium of claim 12, wherein the computer executable instructions, when executed by the computing system, further cause the computing system to at least:
    receive location data for a computing device, the location data indicating that the computing device is positioned within a threshold distance from the rental unit.

14. The computer-readable, non-transitory storage medium of claim 12, wherein the computer executable instructions, when executed by the computing system, further cause the computing system to at least:

receive location data for a computing device;
receive a function activation time of the automated function;
determine an estimated time of arrival of the computing device at the rental unit;
adjust the function activation time based at least in part on the estimated time of arrival of the computing device at the rental unit to result in an adjusted function activation time;
determine that the adjusted function activation time has occurred; and
activate the automated function.

15. A system comprising:
an electronic data store configured to store specific computer-executable instructions; and
a computing device in communication with the electronic data store, the computing device configured to execute the specific computer-executable instructions to at least:
 receive access credentials for an automated function of a rental unit;
 access stay data for the rental unit;
 verify the access credentials;
 in response to verifying the access credentials:
  transition access to the automated function from owner access to traveler access;
  block owner access to the automated function; and
  store data representing at least:
   traveler access to the automated function, and
   blocked owner access to the automated function; and
 in response to an occurrence of an event, transition access to the automated function from traveler access to owner access.

16. The system of claim 15, wherein the computing device is further configured to execute the specific computer-executable instructions to at least receive location data for a second computing device and verify that the location data indicates that the second computing device is positioned within a threshold distance from the rental unit.

17. The system of claim 15, wherein the computing device is further configured to execute the specific computer-executable instructions to at least:
receive location data for a second computing device;
receive a function activation time of the automated function;
determine an estimated time of arrival of the second computing device at the rental unit;
adjust the function activation time based at least in part on the estimated of time arrival of the second computing device at the rental unit to result in an adjusted function activation time;
determine that the adjusted function activation time has occurred; and
activate the automated function.

* * * * *

UNITED STATES PATENT AND TRADEMARK OFFICE
CERTIFICATE OF CORRECTION

PATENT NO.           : 9,934,635 B2                                              Page 1 of 1
APPLICATION NO.      : 14/544209
DATED                : April 3, 2018
INVENTOR(S)          : Ryan Hedley Turner It is certified that error appears in the above-identified patent and that said Letters Patent is hereby corrected as shown below:

In the Claims

In Column 18 at Line 24, In Claim 10, change "that that" to --that--.

In Column 20 at Line 22, In Claim 17, change "of time" to --time of--.

Signed and Sealed this
Eleventh Day of June, 2019

Andrei Iancu
*Director of the United States Patent and Trademark Office*